(12) United States Patent
Jeon et al.

(10) Patent No.: US 8,378,991 B2
(45) Date of Patent: Feb. 19, 2013

(54) METHOD OF DETECTING A TOUCH POSITION AND TOUCH PANEL FOR PERFORMING THE SAME

(75) Inventors: Jin Jeon, Anyang-si (KR); Hyung-Guel Kim, Yongin-si (KR); Kee-Han Uh, Yongin-si (KR)

(73) Assignee: Samsung Display Co., Ltd. (KR)

( * ) Notice: Subject to any disclaimer, the term of this patent is extended or adjusted under 35 U.S.C. 154(b) by 965 days.

(21) Appl. No.: 12/191,212

(22) Filed: Aug. 13, 2008

(65) Prior Publication Data

US 2009/0050376 A1    Feb. 26, 2009

(30) Foreign Application Priority Data

Aug. 21, 2007  (KR) .................. 10-2007-0084067

(51) Int. Cl.
*G06F 3/045* (2006.01)
(52) U.S. Cl. ...................... 345/174; 178/18.06
(58) Field of Classification Search .......... 345/156–184; 340/71; 341/23; 349/12; 178/18.03–20.04
See application file for complete search history.

(56) References Cited

U.S. PATENT DOCUMENTS

| | | | | |
|---|---|---|---|---|
| 4,810,992 A | * | 3/1989 | Eventoff .................. 338/99 |
| 4,922,240 A | * | 5/1990 | Duwaer .................. 345/100 |
| 5,270,711 A | * | 12/1993 | Knapp .................. 341/34 |
| 5,841,078 A | * | 11/1998 | Miller et al. .............. 178/18.06 |
| 2004/0150629 A1 | * | 8/2004 | Lee .................. 345/173 |
| 2005/0116937 A1 | * | 6/2005 | Choi et al. .................. 345/173 |
| 2006/0097991 A1 | | 5/2006 | Hotelling et al. |
| 2007/0070047 A1 | * | 3/2007 | Jeon et al. .................. 345/173 |
| 2007/0120789 A1 | * | 5/2007 | Lee et al. .................. 345/87 |
| 2007/0176905 A1 | * | 8/2007 | Shih et al. .................. 345/173 |
| 2008/0062148 A1 | * | 3/2008 | Hotelling et al. .......... 345/174 |
| 2008/0074401 A1 | * | 3/2008 | Chung et al. .................. 345/175 |
| 2008/0158176 A1 | * | 7/2008 | Land et al. .................. 345/173 |

FOREIGN PATENT DOCUMENTS

| | | |
|---|---|---|
| JP | 2002-287660 | 10/2002 |
| KR | 2004-0022354 | 3/2004 |

* cited by examiner

*Primary Examiner* — Liliana Cerullo
(74) *Attorney, Agent, or Firm* — Innovation Counsel LLP (57) ABSTRACT

A method of detecting a touch position and a touch panel for performing the method are disclosed. In the above-mentioned method, a plurality of scan signals is sequentially supplied to a plurality of first sensor lines arranged in a first direction. Then, at least one of the scan signals is analyzed based on touch events, which is transferred from the first sensor lines to a plurality of second sensor lines arranged in a second direction substantially across to the first direction, and then at least one of touch positions is detected. Therefore, a plurality of scan signals is sequentially applied to the first sensor lines in the first direction, so that a plurality of touch events is simultaneously detected so that a plurality of touch positions may be detected.

18 Claims, 7 Drawing Sheets

METHOD OF DETECTING A TOUCH POSITION AND TOUCH PANEL FOR PERFORMING THE SAME

CROSS-REFERENCE TO RELATED APPLICATIONS

This application claims priority under 35 U.S.C. §119 to Korean Patent Application No. 10-2007-84067, filed on Aug. 21, 2007 in the Korean Intellectual Property Office (KIPO), the contents of which are herein incorporated by reference in their entirety.

BACKGROUND OF THE INVENTION

1. Field of the Invention

The present invention relates to a method of detecting a touch position and a touch panel for performing the method. More particularly, the present invention relates to a method of detecting a touch position, which is adapted to a liquid crystal display (LCD) device, and a touch panel for performing the method of detecting the touch position.

2. Description of the Related Art

Generally, a touch panel is an electric device that executes an internal program in response to touch events such as a compression, light, etc. For example, the touch panel receives the touch event from an external side to detect a touch position of the touch event, and executes the internal program corresponding to the touch position.

The touch panel may be adapted to a flat display device such as a liquid crystal display (LCD) device. The LCD having the touch panel adapted thereto detects a touch position of the touch event applied on a display screen, and executes the internal program corresponding to the touch position to display an image.

However, the touch panel may be driven through a driving type that is capable of detecting one touch position at a time. That is, the touch panel may be driven by a resistance film that is capable of detecting one touch event through a plurality of resistance values corresponding to the touch position. Therefore, a plurality of touch events is not simultaneously detected in the touch panel.

SUMMARY OF THE INVENTION

The present invention provides a method of detecting a touch position capable of detecting a plurality of touch positions by simultaneously recognizing a plurality of touch events.

The present invention also provides a touch panel for performing the above-mentioned touch detecting method.

In one embodiment of the present invention, there is provided a method of detecting a touch position. In the above-mentioned method, a plurality of scan signals is sequentially supplied to a plurality of first sensor lines arranged in a first direction. Then, at least one of the scan signals is analyzed based on touch events, which is transferred from the first sensor lines to a plurality of second sensor lines arranged in a second direction substantially perpendicular to the first direction, and then at least one of touch positions is detected.

At least one of a plurality of touch switches, which electrically connect the first sensor and second sensor lines, may be turned on by the touch event, so that the scan signal may be transferred from the first sensor lines to the second sensor lines.

In the above-mentioned method of detecting at least one of touch positions, the scan signal transferred to the second sensor lines may be stored in a position detecting memory, and then at least one of the touch positions may be detected by analyzing the data stored in the position detecting memory.

In the above-mentioned method of detecting the touch position by analyzing the data, the touch position may be detected based on whether the sensor switch is turned on or turned off through the data stored in the position detecting memory.

The scan signals may be synchronized with a vertical signal for displaying an image. For example, the scan signals may be synchronized with at least one frequency of about 60 Hz and about 120 Hz.

In another embodiment of the present invention, a touch panel may include a panel unit, a plurality of sensor switches, and a scan signal generating section.

The panel unit may include a plurality of first sensor lines arranged in a first direction and a plurality of second sensor lines arranged in a second direction substantially perpendicular to the first direction. The sensor switches may be disposed in accordance with a plurality of positions where the first and second sensor lines cross each other to electrically connect the first sensor lines and the second sensor lines. The scan signal generating section may sequentially supply a plurality of scan signals to the first sensor lines in the first direction.

The scan signal generating section may include a plurality of scan driving transistors, and a plurality of scan signal control parts. The scan driving transistors may be electrically connected to the first sensor lines, respectively. The scan signal control parts may be electrically connected to the scan driving transistors, respectively, to turn on or turn off the scan driving transistors.

Each of the scan driving transistors may include a gate electrode, a source electrode, and a drain electrode. The gate electrode may be electrically connected to the scan signal control part to receive a scan control signal from the scan signal control part. The source electrode may receive a scan voltage. The drain electrode may be electrically connected to a first terminal of the first sensor line. For example, the scan voltage may be substantially a ground voltage.

The touch panel may further include a sensor signal output part electrically connected to first terminals of the second sensor lines to output a plurality of sensor signals corresponding to turn-on or turn-off of the sensor switches.

The touch panel may further include a position detecting memory electrically connected to the sensor signal output part to receive the sensor signals, and to store the sensor signals.

The panel unit may include a first substrate including the first and second sensor lines and a plurality of pixel parts for displaying an image, a second substrate facing the first substrate, and a liquid crystal layer interposed between the first and second substrates.

Each of the sensor switches may include a first sensor electrode formed on the first substrate to be electrically connected to one of the first sensor lines, a second sensor electrode formed on the first substrate adjacent to the first sensor electrode, the second sensor electrode electrically connected to one of the second sensor lines, and a touch electrode formed to be faced to the first and second sensor electrodes. The touch electrode is contacted to the first and second sensor electrodes by an external force. Here, the second substrate may include a common electrode spaced apart from the touch electrode by a predetermined distance. The touch electrode may be formed from a conductive layer to form the common electrode.

Each of the sensor switches may further include a touch spacer formed between the touch electrode and the second substrate to decrease a distance between the touch electrode and the first and second sensor electrodes when touched.

The panel unit may further include a plurality of cell gap maintaining members disposed in a position adjacent to the sensor switches, respectively, to maintain a cell gap between the first and second substrates.

According to the above-mentioned present invention, a plurality of scan signals is sequentially applied to the first sensor lines in the first direction, so that a plurality of touch events is simultaneously detected so that a plurality of touch positions may be detected.

BRIEF DESCRIPTION OF THE DRAWINGS

The above and other advantages of the present invention will become readily apparent by reference to the following detailed description when considered in conjunction with the accompanying drawings wherein.

DESCRIPTION OF THE EMBODIMENTS

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the present invention will be described in detail with reference to the accompanying drawings.

Figure 1:
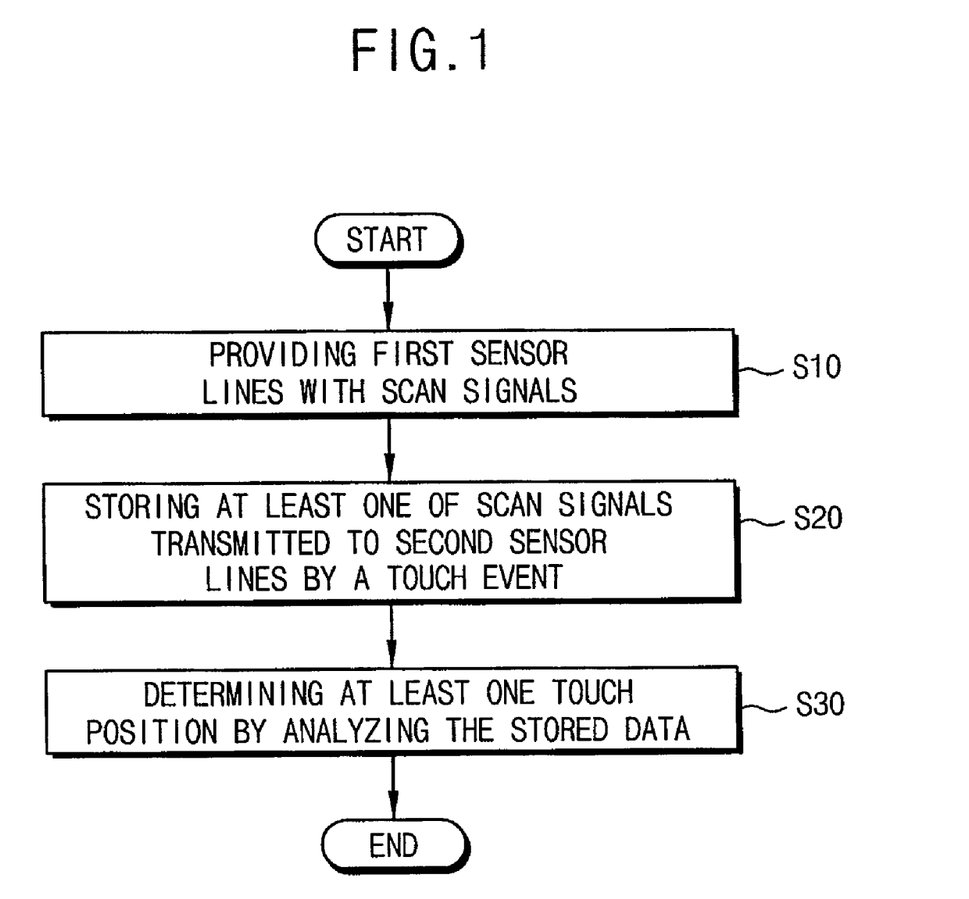
FIG. 1 is a flow chart showing a method of detecting a touch position according to one embodiment of the present invention.
Figure 2:
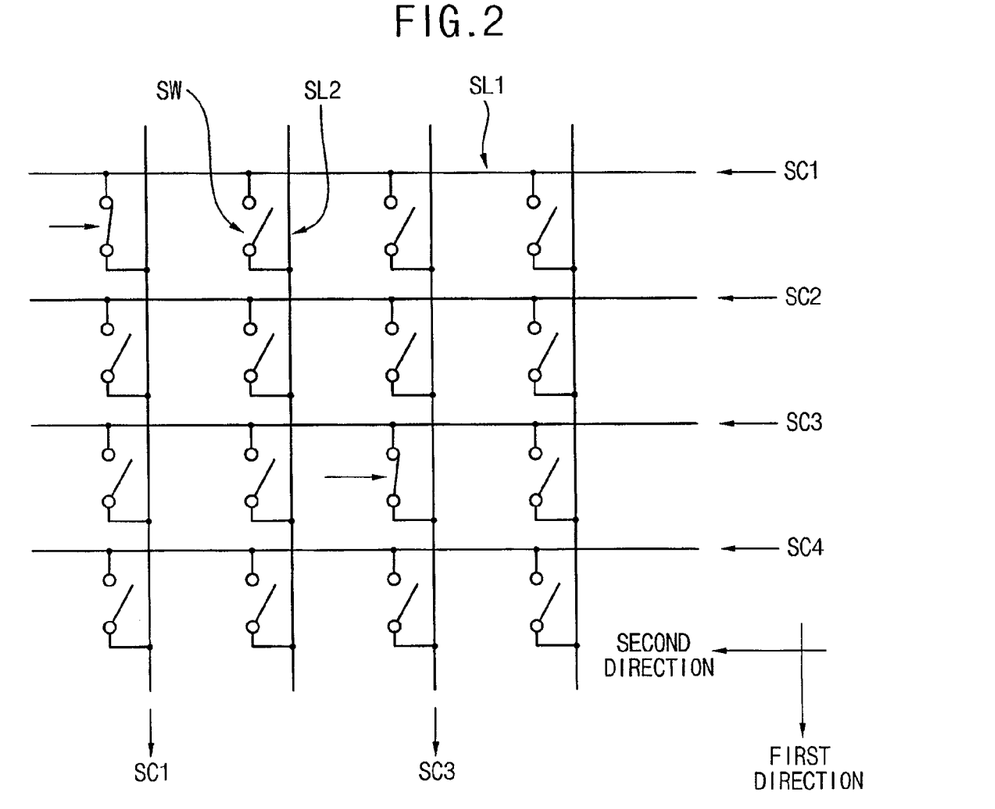
FIG. 2 is a circuit diagram schematically showing an electrical connection relationship among a first sensor line, a second sensor line and a sensor switch to describe a method of detecting a touch position.
Figure 3:
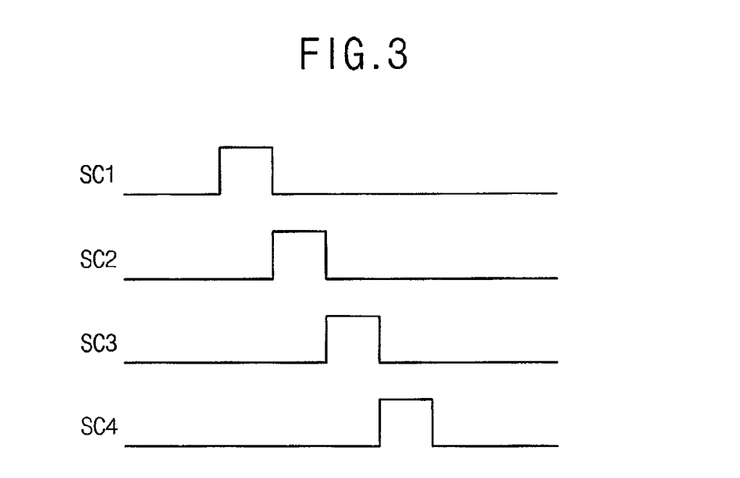
FIG. 3 is waveforms showing first to fourth scan signals of FIG. 2.

FIG. 1 is a flow chart showing a method of detecting a touch position according to one embodiment of the present invention. FIG. 2 is a circuit diagram schematically showing an electrically connection relationship among a first sensor line, a second sensor line and a sensor switches to describe a method of detecting a touch position. FIG. 3 is waveforms showing first to fourth scan signals of FIG. 2.

Referring to FIGS. 1, 2 and 3, a method of detecting a touch position according to the present invention will be described.

A plurality of scan signals is sequentially applied to a first sensor lines SL1 arranged in a first direction (step S10).

The first sensor lines SL1 are disposed along the first direction. For example, four of the first sensor lines SL1 are disposed along the first direction, and first to fourth scan signals SC1, SC2, SC3 and SC4 are sequentially applied to the four first sensor lines SL1, respectively, along the first direction.

Then, at least one of the scan signals is stored, which is transferred from the first sensor lines SL1 to the second sensor lines SL2 by a touch event (step S20). That is, at least one of the scan signals is transferred from the first sensor lines SL1 to the second sensor lines SL2 by the touch event, and the scan signal transferred to the second sensor lines SL2 is stored.

The second sensor lines SL2 are disposed substantially parallel to each other along a second direction crossing the first direction. The second direction may be substantially perpendicular to the first direction. For example, four of the second sensor lines SL2 are disposed substantially parallel to each other along the second direction.

A plurality of sensor switches SW may be disposed in a position where the first and second sensor lines SL1 and SL2 cross each other. The sensor switches SW electrically connect the first and second sensor lines SL1 and SL2, respectively. For example, the number of each of the first and second sensor lines SL1 and SL2 is four, so that the number of the sensor switches SW is sixteen. The sixteen switches SW may be disposed in a 4 by 4 matrix shape.

The touch event may be compression force, light, magnetic force, etc., applied on a touch panel. The touch event is applied to the touch panel, thereby turning on at least one of the sensor switches SW. For example, when two touch events are simultaneously applied to the touch panel, two sensor switches SW are turned on. The two sensor switches SW may be, for example, a sensor switch disposed in a 1 by 1 matrix location, a sensor switch disposed in a 3 by 3 matrix location, etc.

When at least one of the sensor switches SW is turned on, at least one of the scan signals is transferred from the first sensor lines SL1 to the second sensor lines SL2. For example, when the sensor switches SW disposed in the 1 by 1 matrix location and the sensor switches SW disposed in the 3 by 3 matrix location are turned on, the first and third scan signals SC1 and SC3 are transferred from the first sensor lines SL1 to the second sensor lines SL2.

The at least one of the scan signals transferred to the second sensor lines SL2 may be stored in an additional position detecting memory. That is, each of a first terminal of the second sensor lines SL2 may be electrically connected to the position detecting memory, and the at least one of the scan signals transferred to the second sensor lines SL2 may be stored in the position detecting memory.

For example, the position detecting memory may include a plurality of unit memory corresponding to each of the sensor switches SW. The position detecting memory stores a touch position data of the touch panel using at least one of the scan signals.

Lastly, the stored data is analyzed to detect at least one of the touch positions (step S30).

The touch position data of the touch panel stored in the position detecting memory may include position information corresponding to at least one of the turned-on sensor switches and the turned-off sensor switches among the sensor switches SW.

Therefore, when the touch position data of the touch panel stored in the position detecting memory is analyzed, the at least one of turned-on sensor switches and the turned-off sensor switches may be distinguished. As a result, at least one of the touch positions may be detected from the touch event.

In the present embodiment, the touch panel may include a panel unit for displaying an image. The panel unit may display an image using an image drive signal. The image drive signal may include a vertical synchronizing signal notifying start or end of one frame. Here, the scan signals sequentially applied to the first sensor lines SL1 may be a synchronized signal that is synchronized with the vertical signal. The scan signals may be synchronized with at least one frequency of about 60 Hz and about 120 Hz.

According to the present embodiment, as the scan signals are sequentially applied to the first sensor lines SL1 along a first direction, even though a plurality of touch events are simultaneously applied to the touch panel, a plurality of touch positions for one frame may be detected.

Figure 4:
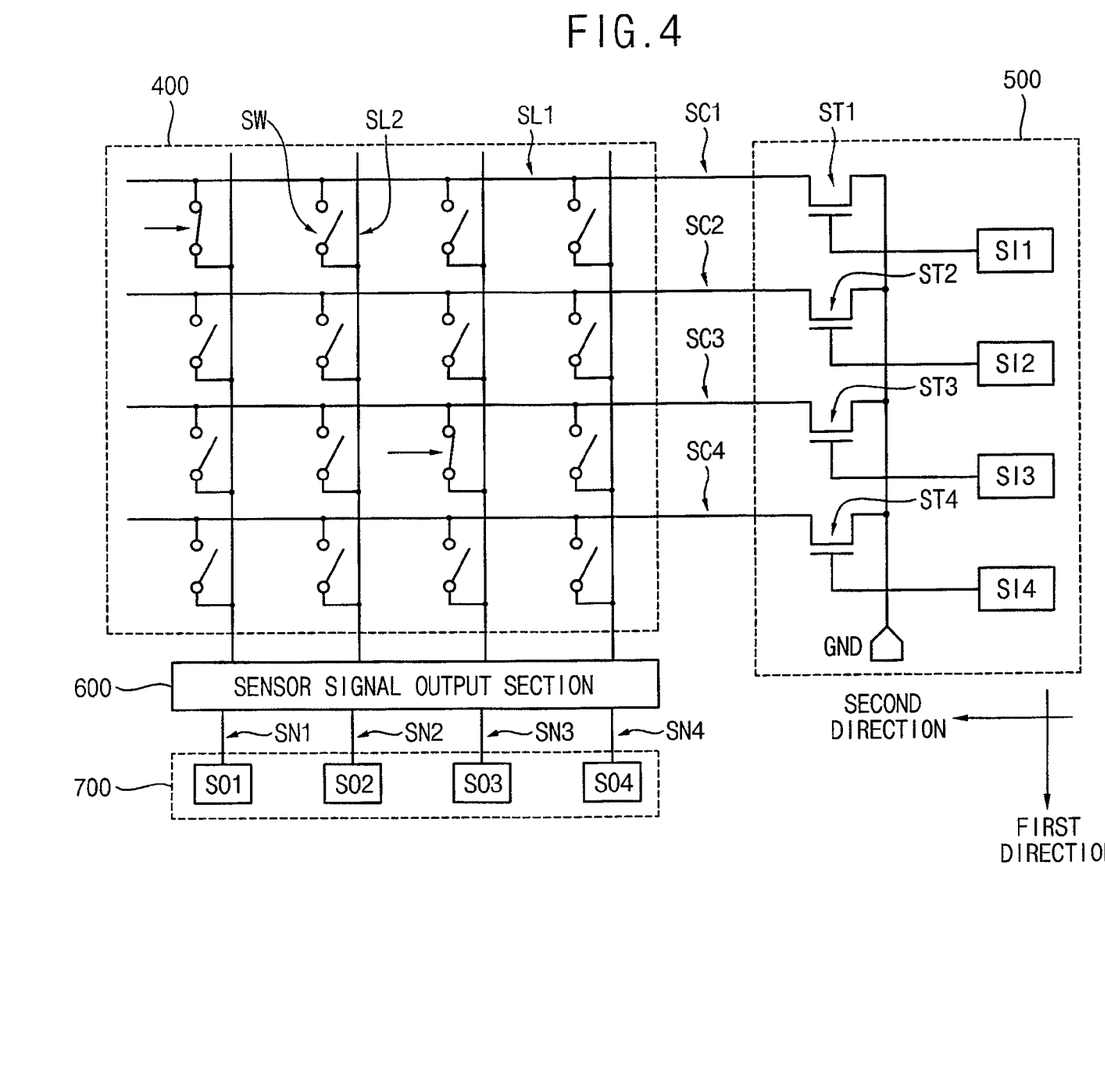
FIG. 4 is a circuit diagram schematically showing a touch panel according to one embodiment of the present invention.

FIG. 4 is a circuit diagram schematically showing a touch panel according to one embodiment of the present invention.

Referring to FIG. 4, a touch panel according to the present invention includes a panel unit 400, a plurality of sensor switches SW, a scan signal generating section 500, a sensor signal output section 600, and a position detecting memory 700.

The panel unit 400 includes a plurality of first sensor lines SL1 and a plurality of second sensor lines SL2. The first sensor lines SL1 are disposed substantially parallel to each other along a first direction. The second sensor lines SL2 are disposed substantially parallel to each other along a second direction crossing the first direction. The first and second directions may be substantially perpendicular to each other. For example, four of the first sensor lines SL1 may be disposed substantially parallel to each other along the first direction, and four of the second sensor lines SL2 may be disposed substantially parallel to each other along the second direction.

The sensor switches SW may be disposed in a position where the first and second sensor lines SL1 and SL2 are crossed with each other. The sensor switches SW electrically connects the first and second sensor lines SL1 and SL2, respectively. For example, the sensor switches SW may be disposed in a 4 by 4 matrix shape to be corresponding to four of the first sensor lines SL1 and four of the second sensor lines SL2.

The sensor switches SW usually maintain turn-off states. However, when a touch event is generated on the panel unit 400 in response to a touch operation of a user, a portion of the sensor switches SW may be alternated from the turn-off states to a turn-on state. For example, a sensor switch disposed in an 1 by 1 matrix location and a sensor switch disposed in a 3 by 3 matrix location are alternated from the turn-off states to a turn-on state in response to two events.

The scan signal generating section 500 is disposed in a first side of the panel unit 400 in the second direction with respect to the panel unit 400. The scan signal generating section 500 is electrically connected to each of first terminals of the first sensor lines SL1 to apply scan signals to the first sensor lines SL1. The scan signals are sequentially applied to the first sensor lines SL1 along the first direction. For example, the first to fourth scan signals SC1, SC2, SC3 and SC4 may be sequentially applied to the first sensor lines SL1 along the first direction.

The scan signal generating section 500 may include a plurality of scan driving transistors and a plurality of scan driving control parts. The scan driving transistors are electrically connected to one-to-one correspondence with each of the first sensor lines. The scan driving control parts are electrically connected to one-to-one correspondence with the scan driving transistors to apply scan control signals to the scan driving transistors. The scan control signals may turn on or turn off each of the scan driving transistors.

Each of the scan driving transistors may include a gate electrode, a source electrode, and a drain electrode. The gate electrode is electrically connected to one of the scan driving control parts to receive one of the scan control signals. The source electrode receives a scan voltage. The scan voltage may include, for example, a ground voltage GND. The drain electrode is electrically connected to one of the first sensor lines SL1.

For example, four of scan driving transistors ST1, ST2, ST3 and ST4 are electrically connected one-to-one correspondence with each of first terminals of four of the first sensor lines SL1. Four of scan driving control parts S11, S12, S13 and S14 are electrically connected to the four scan driving transistors ST1, ST2, ST3 and ST4, respectively, so that first to fourth scan control signals are applied to the four scan driving transistors ST1, ST2, ST3 and ST4, respectively.

The sensor signal output section 600 is disposed in a first side of the first panel unit 400 in the first direction with respect to the panel unit 400. The sensor signal output section 600 is electrically connected to each of the second sensor lines SL2. When at least one of scan signals is transferred from the first sensor lines SL1 to the second sensor lines SL2 by at least one of the sensor switches SW that is turned on, the sensor signal output section 600 receives at least one of the scan signals. For example, when the sensor switch disposed in the 1 by 1 matrix location and the sensor switch disposed in the 3 by 3 matrix location are turned on, the sensor signal output section 600 receives the first scan signal SC1 and the third scan signal SC3.

The sensor signal output section 600 outputs the sensor signals corresponding to a turn-on/turn-off variation of the sensor switches SW in response to at least one of the scan signals. For example, the sensor signal output section 600 is synchronized with a scan timing of the scan signals to output first to fourth sensor signals SN1, SN2, SN3 and SN4.

The position detecting memory 700 is electrically connected to the sensor signal output section 600 to receive the sensor signals and to store the sensor signals. The position detecting memory 700 may store the sensor signals for one frame. Therefore, the position detecting memory 700 stores a data for a touch position corresponding to at least one of touch events applied on the panel unit during one frame.

Figure 5:
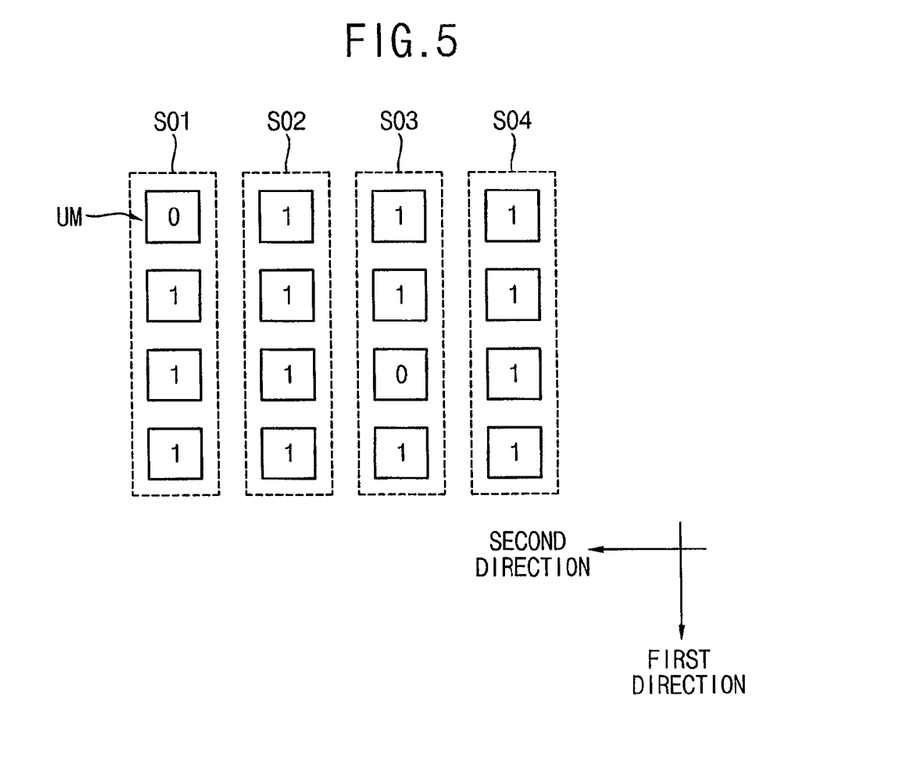
FIG. 5 is a plan view schematically showing a data stored in a position detecting memory of FIG. 4.

FIG. 5 is a plan view schematically showing a data stored in a position detecting memory of FIG. 4.

Referring to FIGS. 4 and 5, the position detecting memory 700 may include a plurality of unit memories UM corresponding to each of the sensor switches SW, respectively. The unit memories UM store a data for turn-on/turned-off of each of the sensor switches SW.

For example, the position detecting memory 700 may include sensor switches SW disposed in the 4 by 4 matrix and sixteen unit memories UM disposed in a corresponding 4 by 4 matrix. The sixteen unit memories UM store a data for turned-on/turned-off of each of the sensor switches SW disposed in the 4 by 4 matrix.

The sixteen unit memories UM may include a first memory block SO1, a second memory block SO2, a third memory block SO3, and a fourth memory block SO4. The first to fourth memory blocks SO1, SO2, SO3 and SO4 may include four unit memories UM, respectively.

Each of the first to fourth memory blocks SO1, SO2, SO3 and SO4 is electrically connected to the sensor signal output section 600 to receive the first to fourth sensor signals SN1, SN2, SN3 and SN4, respectively. Each of the first to fourth memory blocks SO1, SO2, SO3 and SO4 may store the first to fourth sensor signals SN1, SN2, SN3 and SN4 for one frame, respectively. In the present embodiment, the first memory block SO1 will be described.

A first unit memory of the first memory block SO1 may store the first sensor signal SN1 synchronized with the first scan signal SC1. A second unit memory of the first memory block SO1 may store the first sensor signal SN1 synchronized with the second scan signal SC2. A third unit memory of the first memory block SO1 may store the first sensor signal SN1 synchronized with the third scan signal SC3. A fourth unit memory of the first memory block SO1 may store the first sensor signal SN1 synchronized with the fourth scan signal SC4. Accordingly, the first memory block SO1 stores a data for turned-on/turned-off of each of the sensor switches SW disposed in a first column.

Similarly, in accordance with the operation of the first memory block SO1, the second memory block SO2 may store a data for turned-on/turned-off of each of the sensor switches SW disposed in a second column, and the third memory block SO3 may store a data for turned-on/turned-off of each of the sensor switches SW disposed in a third column. Furthermore, the fourth memory block SO4 may store a data for turned-on/turned-off of each of the sensor switches SW disposed in a fourth column.

For example, the unit memories UM may include "1" corresponding to a turned-off state of each of the sensor switches SW and "0" corresponding to a turned-on state of each of the sensor switches SW. Therefore, referring to FIG. 5, the unit memories UM store a data informing that the sensor switch disposed in the 1 by 1 and the 3 by 3 matrix locations are in a turned-on state and the remaining sensor switches are in a turned-off state.

Figure 6:
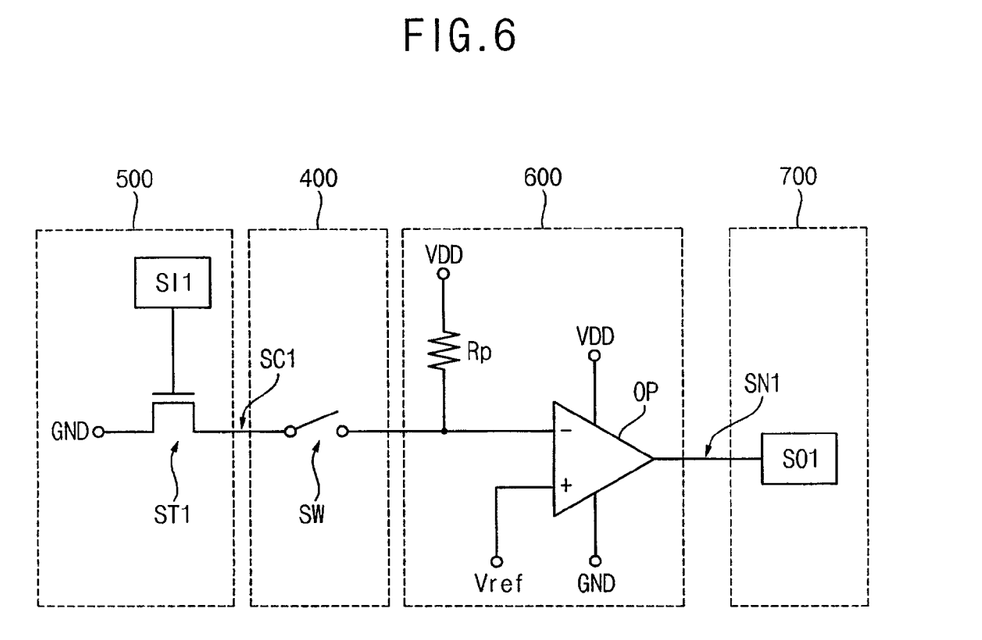
FIG. 6 is a circuit diagram schematically showing a relationship among a first scan control signal, a first scan signal and a first sensor signal in a touch panel of FIG. 4.

FIG. 6 is a circuit diagram schematically showing a relationship among a first scan control signal, a first scan signal and a first sensor signal in a touch panel of FIG. 4.

Referring to FIGS. 4 and 6, a relationship among the first scan control signal, the first scan signal SC1 and the first sensor signal SN1 will be described.

The first scan control signal generated in the first scan driving control part SI1 is applied to a gate electrode of the first scan driving control part SI1 to turn on the first scan driving transistor ST1. When the first scan driving transistor ST1 is turned on, a ground voltage applied to a source electrode of the first scan driving transistor ST1 is transferred to a drain electrode of the first scan driving transistor ST1. Therefore, the first scan driving transistor ST1 outputs the first scan signal SC1 to a first line of the first sensor lines SL1.

The first scan signal SC1 applied to the first line of the first sensor lines SL1 is applied to first column sensor switches SW that are electrically connected to the first line. Here, when at least one of the first column sensor switches SW is turned on by the touch event, the first scan signal SC1 is applied to at least one of the second sensor lines SL2 in a first line of the first sensor lines SL1. For example, the first scan signal SC1 may be applied from a first line of the first sensor lines SL1 to a first line of the second sensor lines SL2.

The sensor signal output section 700 is electrically connected to first line of the second sensor lines SL2 to receive the first scan signal SC1. The sensor signals output section 700 outputs the first sensor signals SN1 to the first memory block SO1 in response to the first scan signal SC1. The first sensor signal SN1 may be a digital signal.

For example, the sensor signal output section 700 may include an operational amplifier OP and a pull-up resistor Rp. The number of the operational amplifiers OP and pull-up resistors Rp may be identical to that of the second sensor lines SL2.

The operational amplifier OP may be operated by receiving a driving direct voltage VDD and a ground voltage GND. A first input terminal (e.g., a negative input terminal) of the operational amplifier OP is electrically connected to one of the second sensor lines SL2. For example, the first input terminal of the operational amplifier OP may be electrically connected to first line of the second sensor lines SL2. A second input terminal (e.g., a positive input terminal) may receive a reference voltage Vref. An output terminal of the operational amplifier OP may be electrically connected to one of the first to fourth memory blocks SO1, SO2, SO3 and SO4. For example, the output terminal of the operational amplifier OP may be electrically connected to the first memory block SO1.

A first terminal of the pull-up resistor Rp receives the driving voltage VDD, and a second terminal of the pull-up resistor Rp is electrically connected to a first input terminal of the operational amplifier OP. A resistance of the pull-up resistor Rp may be about 100 kΩ.

For example, when one of the first column sensor switches SW is turned on and as a result, the first scan signal SC1 is applied to a first line of the second sensor lines SL2, the operational amplifier OP may output the first sensor signal SC1 having a relatively low level. Alternatively, when the first scan signal SC1 is not applied to the first line of the second sensor lines SL2 and as a result, the first line of the second sensor lines SL2 has a floating voltage, the operational amplifier OP may output the first sensor signal SC1 having a relatively high level.

The position detecting memory 700 receives the sensor signals from the sensor signals output section 600 to store the sensor signals. For example, the first memory block SO1 may be electrically connected to an output terminal of the operational amplifier OP to receive the first sensor signals SC1. One of the unit memories of the first memory block SO1 may store "0" or "1" in correspondence with the first sensor signals SC1.

Figure 7:
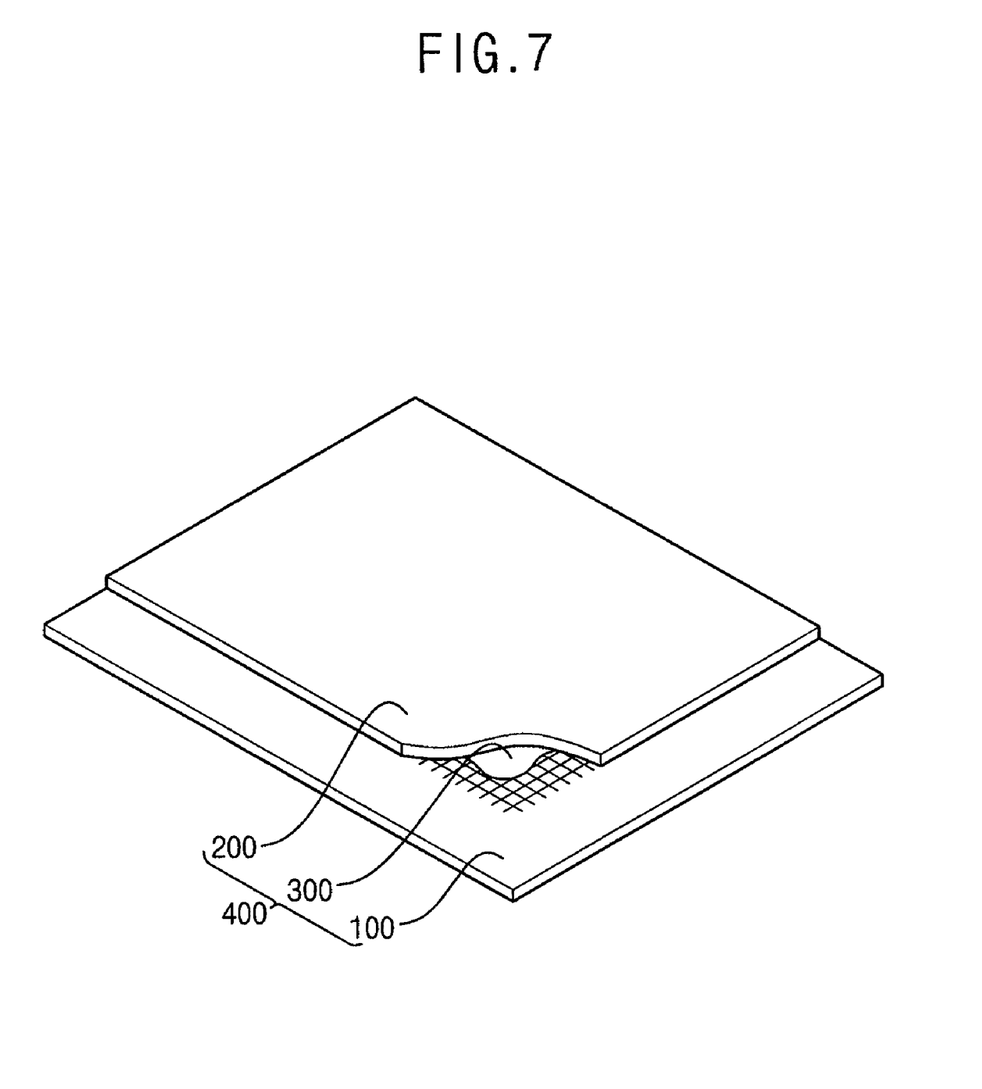
FIG. 7 is a perspective view schematically showing a panel unit of the touch panel of FIG. 4.
Figure 8:
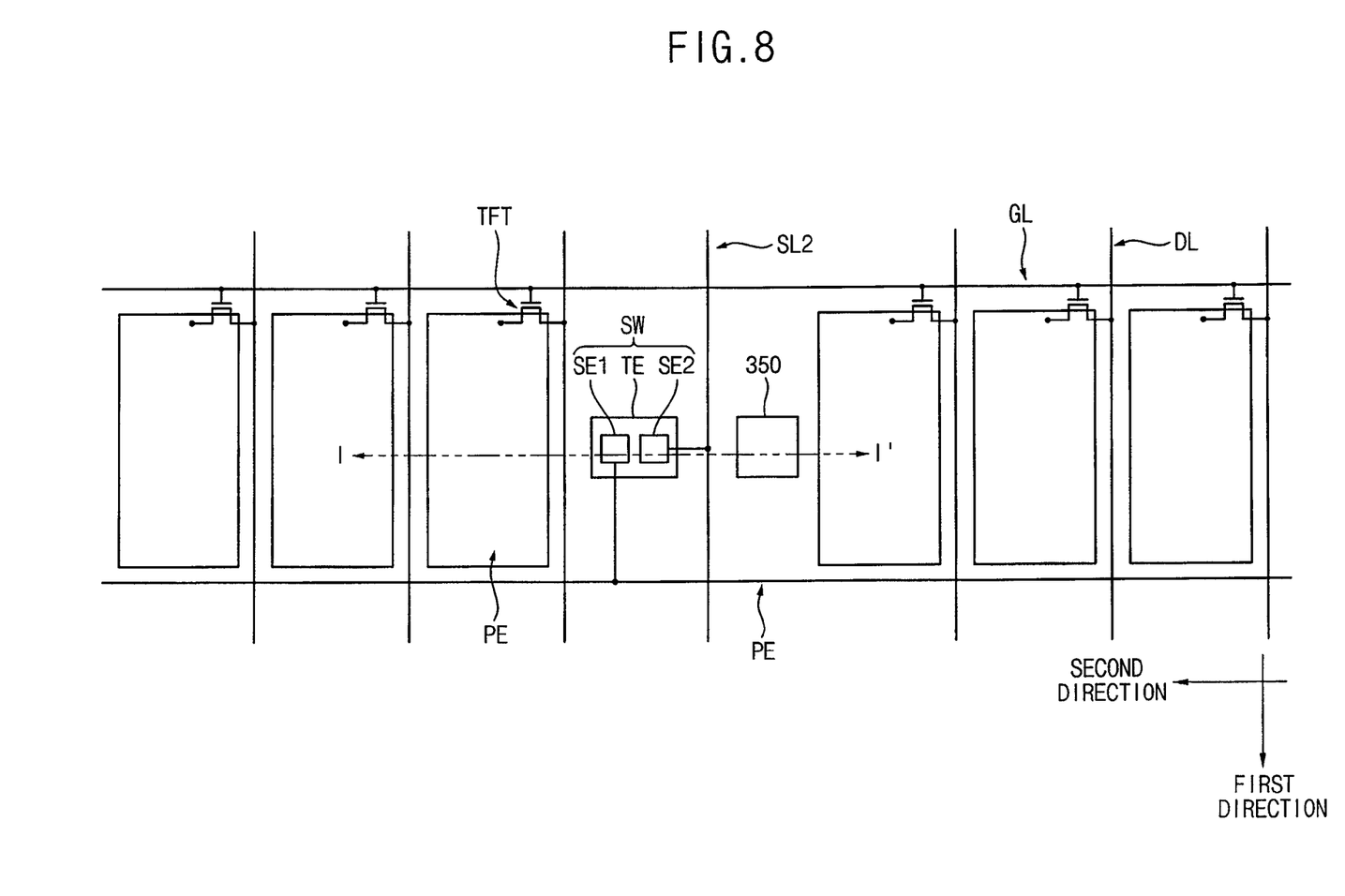
FIG. 8 is an enlarged plan view schematically showing a portion of the touch panel of FIG. 4.
Figure 9:
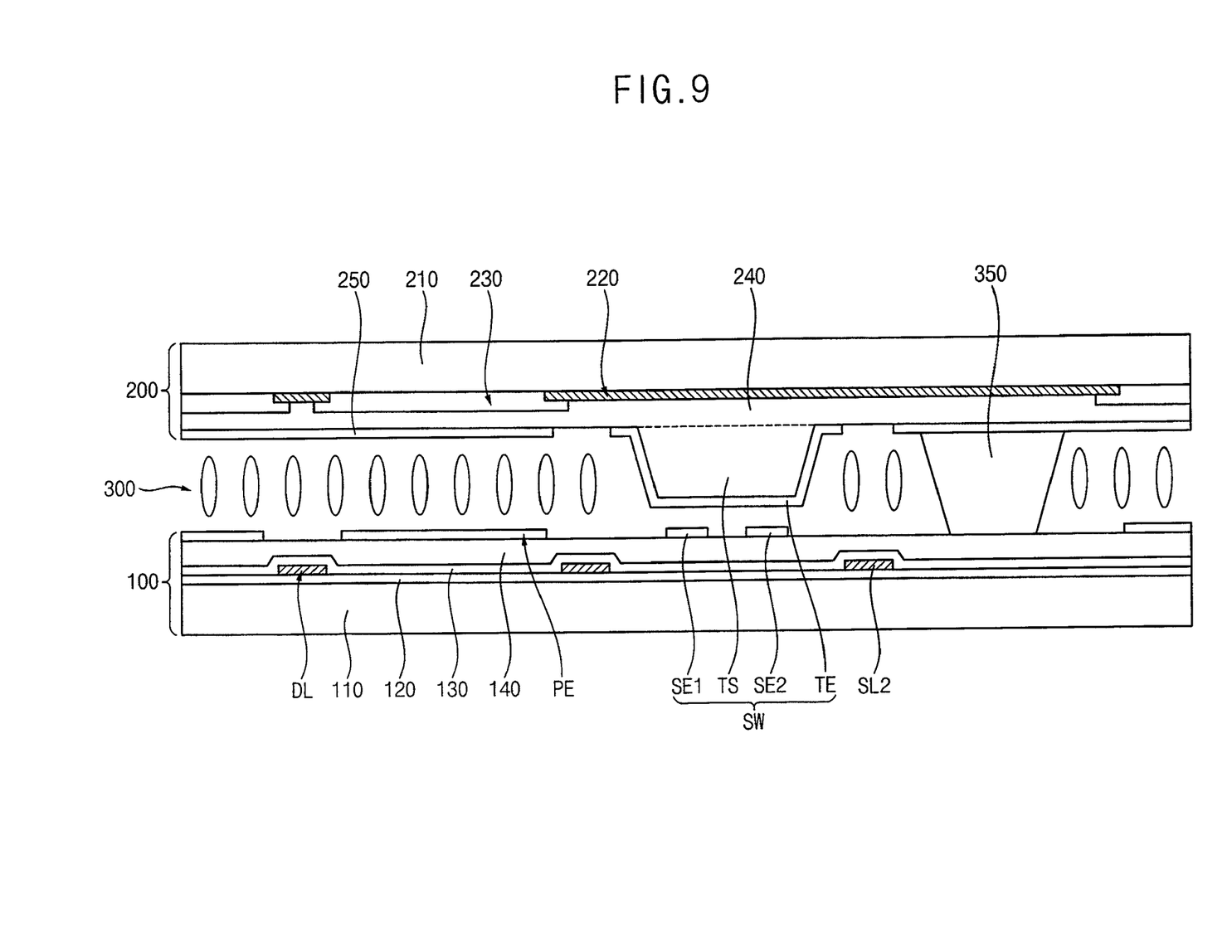
FIG. 9 is a cross-sectional view taken along a line I-I' of FIG. 8.

FIG. 7 is a perspective view schematically showing a panel unit 400 of the touch panel of FIG. 4. FIG. 8 is an enlarged plan view showing a portion of the touch panel of FIG. 4. FIG. 9 is a cross-sectional view taken along a line I-I' of FIG. 8.

Referring to FIGS. 7, 8 and 9, the panel unit 400 according to the present embodiment includes a first substrate 100, a second substrate 200 facing the first substrate 100, a liquid crystal layer 300 interposed between the first and second substrates 100 and 200, and a cell gap maintaining member 350 that maintains a cell gap between the first and second substrates 100 and 200.

The first substrate 100 includes the first sensor lines SL1 and the second sensor lines SL2. The first substrate 100 may further include a first base substrate 110, a plurality of gate lines GL, a gate insulation layer 120, a plurality of data lines DL, a plurality of thin-film transistors (TFTs), a passivation film 130, an organic insulation layer 140, and a plurality of pixel electrodes PE.

The first base substrate 110 may have a plate-shape. The first base substrate 110 may include an optically transparent material. Examples of the transparent material include glass, quartz, plastic, etc.

The gate lines GL are formed on the first base substrate 110, and are disposed substantially in parallel along the first direction. The gate lines GL may be extended along the second direction.

The first sensor lines SL1 are formed on the first base substrate 110, and are disposed substantially in parallel along the first direction. The first sensor lines SL1 are extended along the second direction, and are disposed adjacent to the gate lines GL.

The gate insulation layer 120 is formed on the first substrate 110 to cover the gate lines GL and the first sensor lines SL1.

The data lines DL are formed on the gate insulation layer 120, and are disposed substantially in parallel along the second direction. The data lines DL are extended along the first direction.

The second sensor lines SL1 are formed on the gate insulation layer 120, and are disposed substantially in parallel along the second direction. The second sensor lines SL2 are extended along the first direction, and are disposed adjacent to the data lines SL.

The TFTs may be formed in a crossed area where the gate lines GL and the data lines DL are crossed with each other. Each of the TFTs may be electrically connected to one of the gate lines GL and one of the data lines DL.

The passivation film 130 may be formed on the gate insulation layer 120 to cover the data lines DL, the second sensor lines SL2, and the TFT. For example, the passivation film 130 includes silicon nitride (SiNx), silicon oxide (SiOx), etc.

The organic insulation layer 140 may be formed on the passivation film 130. A surface of the organic insulation layer may have substantially a planar shape. Alternatively, the organic insulation layer 140 may be omitted from the first substrate 100.

The pixel electrodes PE may be formed on the organic insulation layer 140. The pixel electrodes PE may be formed in a crossed area where the gate lines GL and the data lines DL are crossed with each other. Each of the pixel electrodes PE may be electrically connected to one of the TFTs. The pixel electrodes PE may include an optically transparent and electrically conductive material. Alternatively, a plurality of reflective electrodes (not shown) may be formed on the pixel electrodes PE.

The second substrate 200 may include a second base substrate 210, a light-blocking pattern 220, a plurality of color filters 230, an organic covering film 240, and a common electrode 250.

The second base substrate 210 is opposite to the first base substrate 110. The second base substrate 210 may have a plate shape. The second base substrate 210 includes an optically transparent material. Examples of the transparent material include glass, quartz, plastic, etc.

The light-blocking pattern 220 may be formed on a first surface of the second base substrate 210 facing the first base substrate 110. The light-blocking pattern 220 may cover the gate lines GL, the data lines DL, the first sensor lines SL1, the second sensor lines SL2 and the TFTs. Furthermore, the light-blocking pattern 220 may cover the sensor switches SW and the cell gap maintaining members 350.

The color filters 230 may be formed on the first surface of the second base substrate 210 to face the pixel electrodes PE. The color filters 230 include, for example, a plurality of red color filters, a plurality of green color filters, and a plurality of blue color filters. Alternatively, the color filters 230 may be formed on the first base substrate 110.

The organic covering film 240 may be formed on the second base substrate 210 to cover the color filters 230 and the light-blocking pattern 220. Alternatively, the organic covering film 240 may be omitted from the first substrate 100.

The common electrode 250 may be formed on the organic covering film 240. The common electrode 250 may include an optically transparent and electrically conductive material.

The liquid crystal layer 300 is interposed between the first and second substrates 100 and 200. An arrangement of liquid crystal molecules of the liquid crystal layer 300 may be alternated by an electronic field generated between the pixel electrodes PE and the common electrode 250.

The cell gap maintaining members 350 may be interposed between the first and second substrates 100 and 200. The cell gap maintaining members 350 uniformly maintain a cell gap between the first and second substrates 100 and 200. In one example, the cell gap maintaining members 350 may be a plurality of column spacers formed by patterning an organic layer. In another example, the cell gap maintaining members 350 may be a plurality of ball spacers.

Each of the sensor switches SE may include a first sensor electrode SE1, a second sensor electrode SE2, a touch electrode TE, and a touch spacer TS.

The first sensor electrode SE1 may be formed on the organic insulation layer 140 of the first substrate 100. The first sensor electrode SE1 may be electrically connected to one of the first sensor lines SL1.

The second sensor electrode SE2 may be formed on the organic insulation layer 140 of the first substrate 100 to be adjacent to the first sensor electrode SE1. For example, the second sensor electrode SE2 may be formed adjacent to the first sensor electrode SE1 along the second direction. The second sensor electrode SE2 may be electrically connected to one of the second sensor lines SL2.

The first and second sensor electrodes SE1 and SE2 may be spaced apart from the pixel electrodes PE. The first and second sensor electrodes SE1 and SE2 may be formed between the pixel electrodes PE. The first and second sensor electrodes SE1 and SE2 and the pixel electrodes PE may be formed through the same manufacturing process. That is, the pixel electrode layer formed on the organic insulation layer 140 is patterned, so that the pixel electrodes PE, the first and second sensor electrodes SE1 and SE2 may be formed.

Alternatively, the touch spacer TS is formed on the organic insulation layer 240 to be in correspondence with the first and second sensor electrodes SE1 and SE2. An extruding height of the touch spacer TS may be substantially smaller than that of the cell gap maintaining member 350. The touch spacer TS and the organic covering layer 240 may be formed through the same manufacturing process. Alternatively, the touch spacer TS and the organic covering layer 240 may be formed through different manufacturing process to each other. That is, a portion of the organic insulation layer formed on a first surface of the second base substrate 210 may be removed to form the organic insulation layer 240 and the touch spacer TS. Alternatively, a touch spacer layer formed on the organic covering layer 240 is patterned to form the touch spacer TS.

The touch electrode TE may be formed on the touch spacer TS to be opposite to the first and second sensor electrodes SE1 and SE2. As the touch electrode TE is formed on the touch spacer TS, the touch electrode TE may be more closely adjacent to the first and second sensor electrodes SE1 and SE2.

The touch electrode TE may be contacted with the first and second sensor electrodes SE1 and SE2 by an external force applied from an outside of the panel unit 400. For example, when the external force is not applied to the panel unit 400, the touch electrode TE is not contacted with the first and second sensor electrodes SE1 and SE2. When the external force is applied to the panel unit 400, the touch electrode TE is contacted with the first and second sensor electrodes SE1 and SE2. Thus, each of the sensor switches SE may be turned on or turned off.

The touch electrode TE is spaced apart from the common electrode 250. The touch electrode TE and the common electrode 250 may be formed through the same manufacturing process. That is, the common electrode layer formed on the organic insulation layer 240 and the touch spacer TS is patterned, so that the common electrode 250 and the touch electrode TS may be formed.

Each of the cell gap maintaining members 350 may be formed adjacent to each of the sensor switches SW, respectively. Accordingly, each of the cell gap maintaining members 350 prevents the touch electrode TS from contacting with the first and second sensor electrodes SE1 and SE2 by an external impact.

According to the present embodiment, the touch electrode TS is electrically isolated from the common electrode 250, so that the touch electrode TS may perform a role of a switch that electrically connects or isolates between the first and second sensor electrodes SE1 and SE2 by the external force.

As described above, as the scan signals are sequentially applied to the first sensor lines in the first direction, the touch events may be simultaneously detected, though the touch events are applied to the touch panel substantially simultaneously. That is, a plurality of touch positions may be simultaneously detected for one frame corresponding to the touch events.

Furthermore, the touch electrode of the second substrate is electrically isolated from the common electrode, so that the touch electrode may perform a role of a switch that electrically connects or isolates between the first and second sensor electrodes SE1 and SE2 by the external force.

Furthermore, the cell gap maintaining member is formed adjacent to the sensor switches, so that the cell gap maintaining member prevents the touch electrode from contacting with the first and second sensor electrodes by an external impact.

Although the embodiments of the present invention have been described, it is understood that the present invention should not be limited to these embodiments but various changes and modifications can be made by one ordinary skilled in the art within the spirit and scope of the present invention as hereinafter claimed.

What is claimed is:

1. A method of detecting a touch position, the method comprising:
   sequentially supplying a plurality of scan signals to a plurality of first sensor lines arranged in a first direction; and
   detecting at least one touch position where touch events are generated, by analyzing at least one of the scan signals transferred from the first sensor lines to a plurality of second sensor lines arranged in a second direction substantially crossing the first direction by the touch events,
   wherein the detecting at least one touch position comprises turning on of at least one touch switch by the touch event, so that the scan signal is transferred from the first sensor lines to the second sensor lines through the touch switch,
   wherein each of the touch switches comprises;
   a first sensor electrode formed on a first substrate to be electrically connected to one of the first sensor lines;
   a second sensor electrode formed on the first substrate adjacent to the first sensor electrode, the second sensor electrode being electrically connected to one of the second sensor lines; and a touch electrode formed on a second substrate opposite to the first substrate and the first and second sensor electrodes, the touch electrode being configured to be contacted with the first and second electrodes by the touch event to electrically connect the first and second sensor electrodes such that the scan signal is transferred from the first sensor lines to the second sensor lines;

wherein the touch event is an external force applied from an outside of the panel unit, and when the external force is not applied to the panel, the touch electrode is not contacted with the first and second sensor electrodes;

wherein the touch electrode is electrically isolated from a common electrode, the common electrode formed on the second substrate.

2. The method of claim 1, wherein the detecting at least one touch position further comprises:

storing the scan signal transferred from the second sensor lines in a position detecting memory; and detecting the at least one touch position by analyzing the data stored in the position detecting memory.

3. The method of claim 2, wherein the detecting the at least one touch position by analyzing the data further comprises distinguishing whether the touch switches is turned on or turned off through the data stored in the position detecting memory, so as to detect the touch position.

4. The method of claim 1, wherein the scan signals are synchronized with a vertical signal for displaying an image.

5. The method of claim 1, wherein the scan signals are synchronized with at least one frequency of about 60 Hz and about 120 Hz.

6. A touch panel comprising:

a panel unit including a plurality of first sensor lines arranged in a first direction and a plurality of second sensor lines arranged in a second direction across to the first direction;

a plurality of sensor switches being disposed in accordance with a plurality of positions where the first and second sensor lines cross each other to electrically connect to the first sensor lines and the second sensor lines; and a scan signal generating section sequentially supplying a plurality of scan signals to the first sensor lines in the first direction, wherein each of the sensor switches comprises:

a first sensor electrode formed on a first substrate to be electrically connected to one of the first sensor lines;

a second sensor electrode formed on the first substrate adjacent to the first sensor electrode, the second sensor electrode being electrically connected to one of the second sensor lines; and a touch electrode formed on a second substrate opposite to the first substrate and the first and second sensor electrodes, the touch electrode being configured to be contacted with the first and second sensor electrodes by an external force to electrically connect the first and second sensor electrodes such that the scan signals are transferred from the first sensor lines to the second sensor lines;

wherein the external force is applied from an outside of the panel unit, and when the external force is not applied to the panel, the touch electrode is not contacted with the first and second sensor electrodes;

wherein the touch electrode is electrically isolated from a common electrode, the common electrode formed on the second substrate.

7. The touch panel of claim 6, wherein the scan signal generating section comprises:

a plurality of scan driving transistors being electrically connected to the first sensor lines, respectively; and a plurality of scan signal control parts being electrically connected to the scan driving transistors, respectively, to turn on or turn off the scan driving transistors.

8. The touch panel of claim 7, wherein each of the scan driving transistors comprises:

a gate electrode being electrically connected to the scan signal control part to receive a scan control signal from the scan signal control part;

a source electrode receiving a scan voltage; and a drain electrode being electrically connected to a first terminal of the first sensor line.

9. The touch panel of claim 8, wherein the scan voltage is substantially a ground voltage.

10. The touch panel of claim 6, further comprising a sensor signal output part electrically connected to first terminals of the second sensor lines to output a plurality of sensor signals corresponding to turn-on or turn-off state of the sensor switches.

11. The touch panel of claim 10, further comprising a position detecting memory electrically connected to the sensor signal output part to receive the sensor signals, and storing the sensor signals.

12. The touch panel of claim 11, wherein the position detecting memory comprises a plurality of unit memories storing a data for turn-on or turn-off state of the sensor switches in correspondence with the sensor switches.

13. The touch panel of claim 6, wherein the panel unit comprises:

the first substrate including the first and second sensor lines and a plurality of pixel parts for displaying an image;

the second substrate facing the first substrate; and a liquid crystal layer interposed between the first and second substrates.

14. The touch panel of claim 6, wherein the common electrode is spaced apart from the touch electrode by a predetermined distance.

15. The touch panel of claim 14, wherein the touch electrode is formed from a conductive layer to form the common electrode.

16. The touch panel of claim 6, wherein each of the sensor switches further comprises a touch spacer formed between the touch electrode and the second substrate to decrease a distance between the touch electrode and the first and second sensor electrodes.

17. The touch panel of claim 13, wherein each of the pixel parts comprises:

a pixel electrode and a thin-film transistor electrically connected to the pixel electrode; and the first and second sensor electrodes formed from a conductive layer to form the pixel electrode.

18. The touch panel of claim 13, wherein the panel unit further comprises a plurality of cell gap maintaining members disposed in a position adjacent to the sensor switches, respectively, to maintain a cell gap between the first and second substrates.

* * * * *